US008723807B2

(12) United States Patent
Jeon et al.

(10) Patent No.: US 8,723,807 B2
(45) Date of Patent: May 13, 2014

(54) COMBINED TOUCH SENSOR AND LED DRIVER WITH N-TYPE MOSFET PROTECTING TOUCH SENSOR

(75) Inventors: Yung Jin Jeon, Uiwang-si (KR); Eun Jin Lee, Ansan-si (KR)

(73) Assignee: Integrated Device Technology, Inc., San Jose, CA (US)

( * ) Notice: Subject to any disclaimer, the term of this patent is extended or adjusted under 35 U.S.C. 154(b) by 1545 days.

(21) Appl. No.: 11/971,779

(22) Filed: Jan. 9, 2008

(65) Prior Publication Data

US 2009/0174686 A1 Jul. 9, 2009

(51) Int. Cl.
*G06F 3/041* (2006.01)

(52) U.S. Cl.
USPC .......................................... 345/173; 345/174

(58) Field of Classification Search
USPC .................................................. 345/173–179
See application file for complete search history.

(56) References Cited

U.S. PATENT DOCUMENTS

| | | | | |
|---|---|---|---|---|
| 4,571,506 A * | 2/1986 | Lisco | 327/109 |
| 4,878,107 A * | 10/1989 | Hopper | 257/415 |
| 5,563,597 A | 10/1996 | McCartney | |
| 6,246,394 B1 * | 6/2001 | Kalthoff et al. | 345/173 |
| 2004/0238726 A1 * | 12/2004 | Caldwell | 250/221 |
| 2005/0062685 A1 * | 3/2005 | Nogawa | 345/46 |
| 2005/0083110 A1 * | 4/2005 | Latham et al. | 327/538 |
| 2005/0104860 A1 * | 5/2005 | McCreary et al. | 345/173 |
| 2005/0237317 A1 * | 10/2005 | Cok | 345/207 |
| 2007/0030137 A1 * | 2/2007 | Masters et al. | 340/461 |
| 2007/0032967 A1 * | 2/2007 | Feen et al. | 702/47 |
| 2008/0136792 A1 * | 6/2008 | Peng et al. | 345/174 |
| 2008/0198613 A1 * | 8/2008 | Cruickshank | 362/488 |
| 2009/0091536 A1 * | 4/2009 | Callaghan | 345/168 |
| 2009/0225044 A1 * | 9/2009 | Jeon et al. | 345/173 |

FOREIGN PATENT DOCUMENTS

KR 10-2007-0005892 A 10/2007

* cited by examiner

*Primary Examiner* — Alexander Eisen
*Assistant Examiner* — Nelson Lam
(74) *Attorney, Agent, or Firm* — Hayes and Boone LLP

(57) ABSTRACT

A combined touch sensor and light-emitting-diode (LED) driver comprises a touch sensor circuit configured to detect a touch, where the touch sensor circuit is coupled to a common node and configured to operate with a first operating voltage, an LED driver circuit configured to drive an LED if the LED is coupled to the common node, where the LED driver circuit is also coupled to the common node and configured to operate with a second operating voltage is higher than the first operating voltage, and an n-type field effect transistor (FET) connected in series between the common node and the touch sensor. The n-type FET prevents the higher operating voltage of the LED driver from affecting the operation of the touch sensor, when a port of the combined touch sensor and LED driver IC is used to drive an LED. The touch sensor may be a capacitance-to-digital converter.

18 Claims, 8 Drawing Sheets

COMBINED TOUCH SENSOR AND LED DRIVER WITH N-TYPE MOSFET PROTECTING TOUCH SENSOR

BACKGROUND OF THE INVENTION

1. Field of the Invention

The present invention relates to a combined touch sensor and LED (Light-Emitting Diode) driver.

2. Description of the Related Arts

Modern electronic devices often have both a display device to display information and touch sensors to receive input data. There are a variety of types of touch sensor applications, such as touch screens, touch buttons, touch switches, touch scroll bars, and the like. For example, a cellular telephone or personal digital assistant often has a touch screen and a liquid crystal display (LCD) device overlaid with the touch screen.

LCDs typically require a backlight to provide a light source for the LCD display. White LEDs are being used increasingly as the backlight for LCDs. These white LEDs for backlighting LCDs are typically driven by an LED driver that feeds high, constant sink current through the white LEDs to provide constant luminescence, while the anode of the white LED is typically driven by a charge pump circuit.

Touch sensors have a variety of types, such as resistive type, capacitive type, and electro-magnetic type. A capacitive touch screen is coated with a material, typically indium tin oxide, that conducts a continuous electrical current across a sensor. The sensor exhibits a precisely controlled field of stored electrons in both the horizontal and vertical axes of the display to achieve capacitance. The human body is also an electrical device which has stored electrons and therefore also exhibits capacitance. When the sensor's normal capacitance field (its reference state) is altered by another capacitance field, e.g., by the touch with someone's finger, capacitive type touch sensors located at each corner of the touch screen panel measure the resultant distortion in the characteristics of the reference field and send the information about the touch event to the touch screen controller for mathematical processing. There are a variety of types of capacitive touch sensors, including Sigma-Delta modulators (also known as capacitance-to-digital converters (CDCs)), charge transfer type capacitive touch sensors, and relaxation oscillator type capacitive touch sensors.

Because of the small size required in mobile electronic devices such as cellular telephones, LED drivers are sometimes combined with touch sensors on one integrated circuit (IC) chip. In this case, one or more ports of the combined touch sensor and LED driver IC may be used for the touch sensors in one instance and the LED driver in another instance depending upon the settings on the IC. These common, shared ports on the combined touch sensor and LED driver IC are beneficial, because (i) the size of the IC may be reduced and (ii) the same port may be conveniently used with the touch sensor or the LED driver depending upon the user's settings and needs. However, combining the LED driver with touch sensor on one IC with shared ports may present problems due to different operating voltages used in the LED driver and the touch sensor. Touch sensors typically operate on an operating voltage of 1.65-1.95 volt, while LED drivers typically operate on a much higher operating voltage of 3.0-4.3 volt in order to drive the LED. Since the LED driver is fabricated on the same IC as the touch sensor and both the LED driver and touch sensor may be connected to a shared port of the combined touch sensor and LED driver IC, the higher operating voltage of the LED driver may affect the operation of the touch sensor circuit and thereby cause malfunction in the touch sensor circuit or even damage the touch sensor circuit.

Thus, there is a need for a combined touch sensor and LED driver IC without such problems.

SUMMARY OF THE INVENTION

Embodiments of the present invention include a technique for electrically separating the different operating voltages of an LED driver circuit and touch sensor circuit in a combined touch sensor and LED driver IC. The touch sensor circuit may be a capacitance-to-digital converter (CDC) circuit. More specifically, in one embodiment, a combined touch sensor and light-emitting-diode (LED) driver comprises a touch sensor circuit configured to detect a touch, where the touch sensor circuit is coupled to a common node and configured to operate with a first operating voltage, an LED driver circuit configured to drive an LED if the LED is coupled to the common node, the LED driver circuit also coupled to the common node and configured to operate with a second operating voltage that is higher than the first operating voltage, and an n-type field effect transistor connected in series between the common node and the touch sensor. The n-type field effect transistor may be an n-type MOSFET (Metal Oxide Semiconductor Field Effect Transistor). The present invention has the advantage that the higher operating voltage of the LED driver circuit is prevented from affecting the operation of the touch sensor circuit, when a port of the combined touch sensor and LED driver IC is used to drive an LED.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
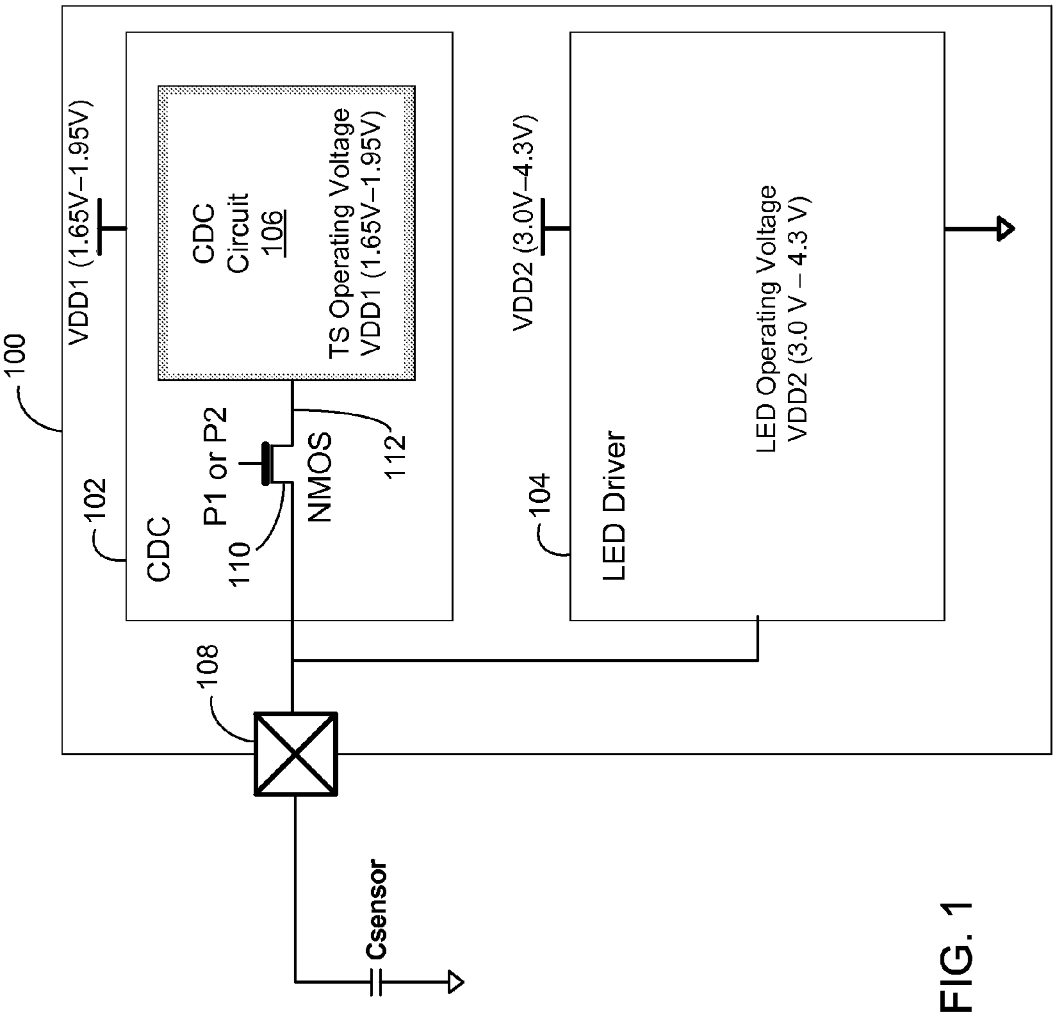
FIG. 1 illustrates a combined capacitance-to-digital converter (CDC) and LED driver used as the CDC circuit, according to one embodiment of the present invention.
Figure 4A:
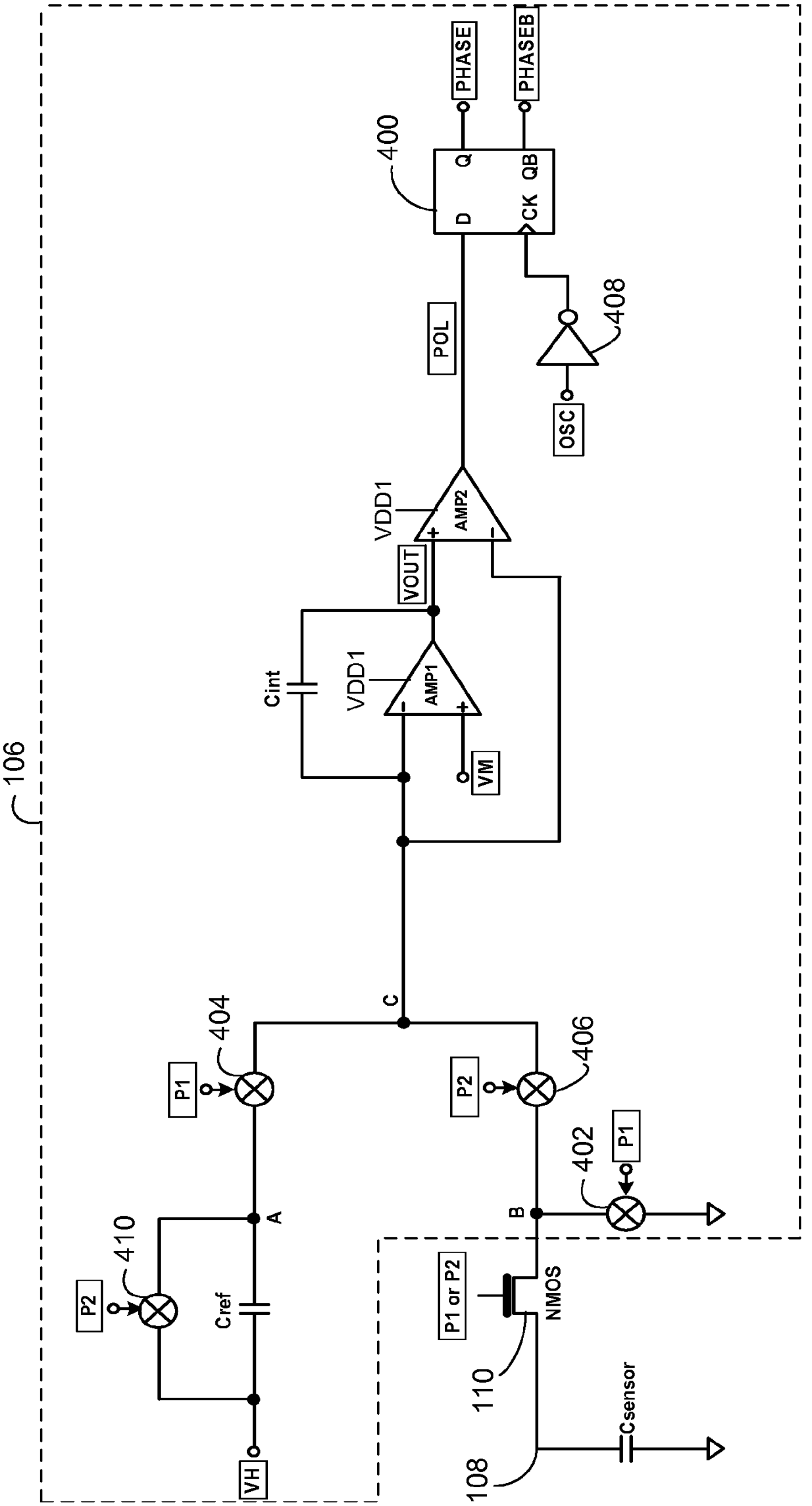
FIG. 4A illustrates the CDC circuit and how an n-type MOSFET is added to the CDC circuit, according to one embodiment of the present invention.

FIG. 1 illustrates a combined capacitance-to-digital converter (CDC) and LED driver used as the CDC circuit, according to one embodiment of the present invention. The combined CDC and LED driver IC 100 includes both a CDC module 102 and an LED driver module 104. The CDC driver module 102 operates to sense touches on a touch screen (not shown herein). The CDC driver module 102 includes the actual CDC circuit 106 that operates with a touch screen (TS) operating voltage of VDD1 (e.g., 1.65 V-1.95 V), and an n-type MOSFET (NMOS) 110 connected in series with the CDC circuit 106. The LED driver 104 operates with an operating voltage of VDD2 (e.g., 3.0 V-4.3 V). The LED driver 104 can be any conventional type of LED driver that provides a regulated current to an LED. For example, one such LED driver is illustrated in U.S. patent application Ser. No. 11/855,904 filed on Sep. 14, 2007 entitled "Progammable LED driver," which is assigned to the same assignee as the present application and is incorporated by reference herein in its entirety. Likewise, the CDC circuit 106 may be any type of CDC circuit that detects touches on a touch screen and converts the charges stored in a capacitor to digital values. One example of a CDC circuit is illustrated in FIG. 4A, as will be explained below in more detail. Although the embodiment of FIG. 1 is illustrated as a combined CDC and LED driver with the CDC being a type of touch sensor, the present invention can be used with any type of combined touch sensor and LED driver IC with the touch sensor and the LED driver connected to a common node, as long as the touch sensor includes a component configured to operate on a voltage lower than the voltage used by the LED driver.

Both the CDC module 102 and the LED driver 104 are connected to the port 108 of the IC 100, so that the port 108 can be used to control either the CDC module 102 or the LED driver 104 depending upon the application of the IC 100. The example of FIG. 1 illustrates the IC 100 being used as a CDC application. Thus, the sense capacitor $C_{sensor}$ that detects the touches on the touch screen is connected in series to the port 108. Although only one port 108 is shown in FIG. 1 for simplicity of illustration, the IC 100 may have many such ports, some of which are shared between the CDC module 102 and the LED driver 104 as in FIG. 1 and others of which are dedicated to either the CDC module 102 or the LED driver 104.

The NMOS 110 is connected between the port 108 and the CDC circuit 106. As will be explained below, a non-overlapping 2-phase clock (P1, P2) is applied to the gate of NMOS 110, so that the NMOS 110 is maintained in the "on" state most of the time except during the transitional periods of the non-overlapping 2 phase clock (P1, P2). The NMOS 110 prevents the operating voltage VDD2 of the LED driver from affecting the CDC circuit 106 when an LED driver 104 is connected to the port 108 and the IC 100 is used as an LED driver. More specifically, when VDD1 is applied to the gate of NMOS 110, the voltage at node 112 is clamped and does not exceed VDD1−Vt(n), where VDD1 is the operating voltage of the CDC circuit 106 and Vt(n) is the threshold turn-on voltage of NMOS 110. Note that a p-type MOSFET may not be used in the place of NMOS 110, because such p-type MOSFET would pass a voltage higher than VDD1 to the CDC circuit 106.

Figure 2:
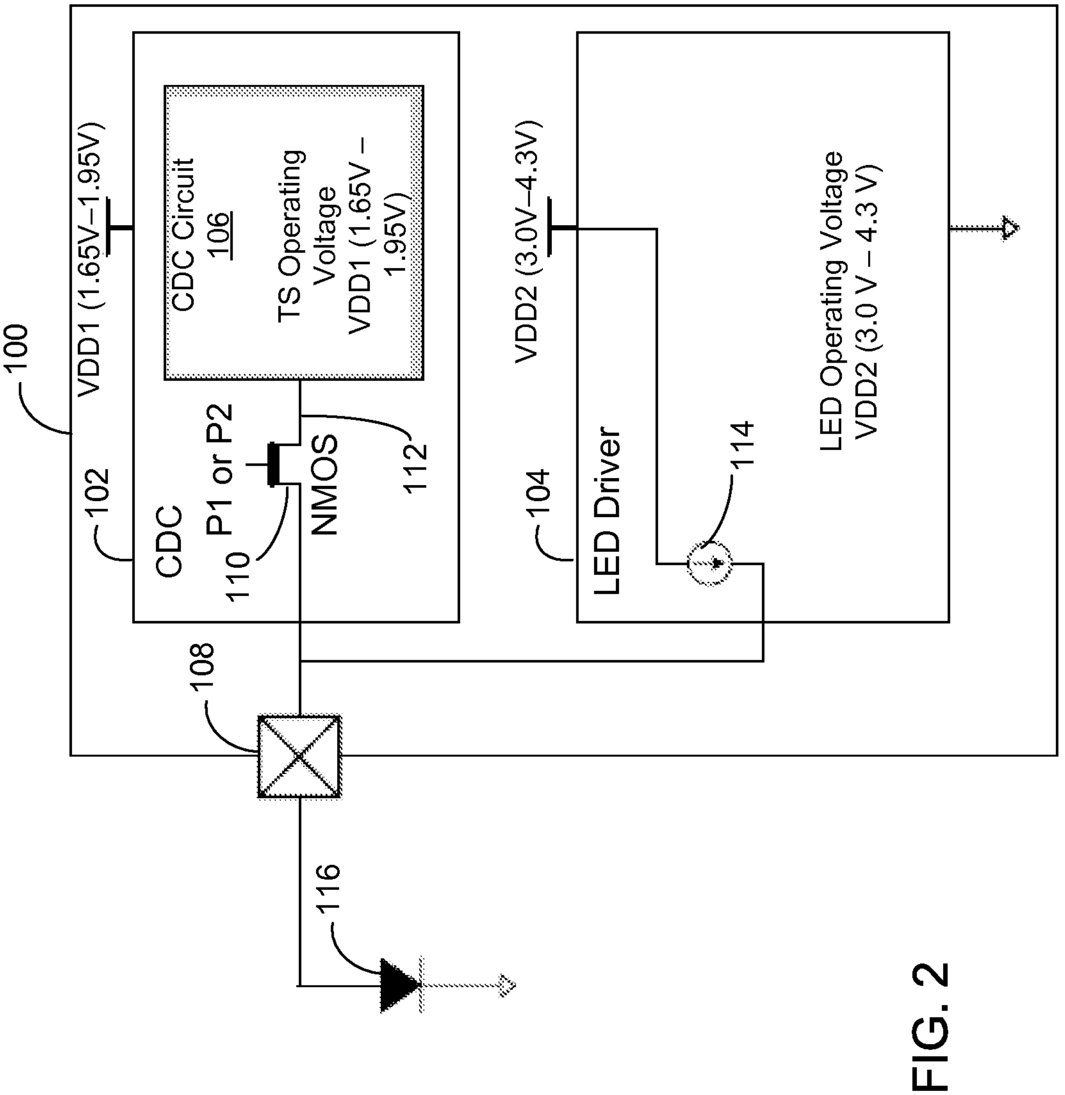
FIG. 2 illustrates a combined capacitance-to-digital converter (CDC) and LED driver used as the LED driver, according to another embodiment of the present invention.

FIG. 2 illustrates a combined capacitance-to-digital converter (CDC) and LED driver used as the LED driver, according to another embodiment of the present invention. The IC 100 of FIG. 2 is the same as the IC 100 of FIG. 1, except that the IC 100 is used as an LED driver application in the example of FIG. 2. Thus, an LED 116 is connected between port 108 and ground. The LED driver 104 includes a current source 114 that provides regulated current to the LED 116 through the port 108 of the IC 100. The current source 114 is connected between the operating voltage VDD2 and the port 108. However, NMOS 110 prevents the operating voltage VDD2 of the LED driver 104 from affecting the CDC circuit 106. As explained above, when VDD1 is applied to the gate of NMOS 110, the voltage at node 112 is clamped and does not exceed VDD1−Vt(n), where VDD1 is the operating voltage of the CDC circuit 106 and Vt(n) is the threshold turn-on voltage of NMOS 110. Note that a p-type MOSFET may not be used in the place of NMOS 110, because such p-type MOSFET would pass a voltage higher than VDD1 to the CDC circuit 106.

Figure 3:
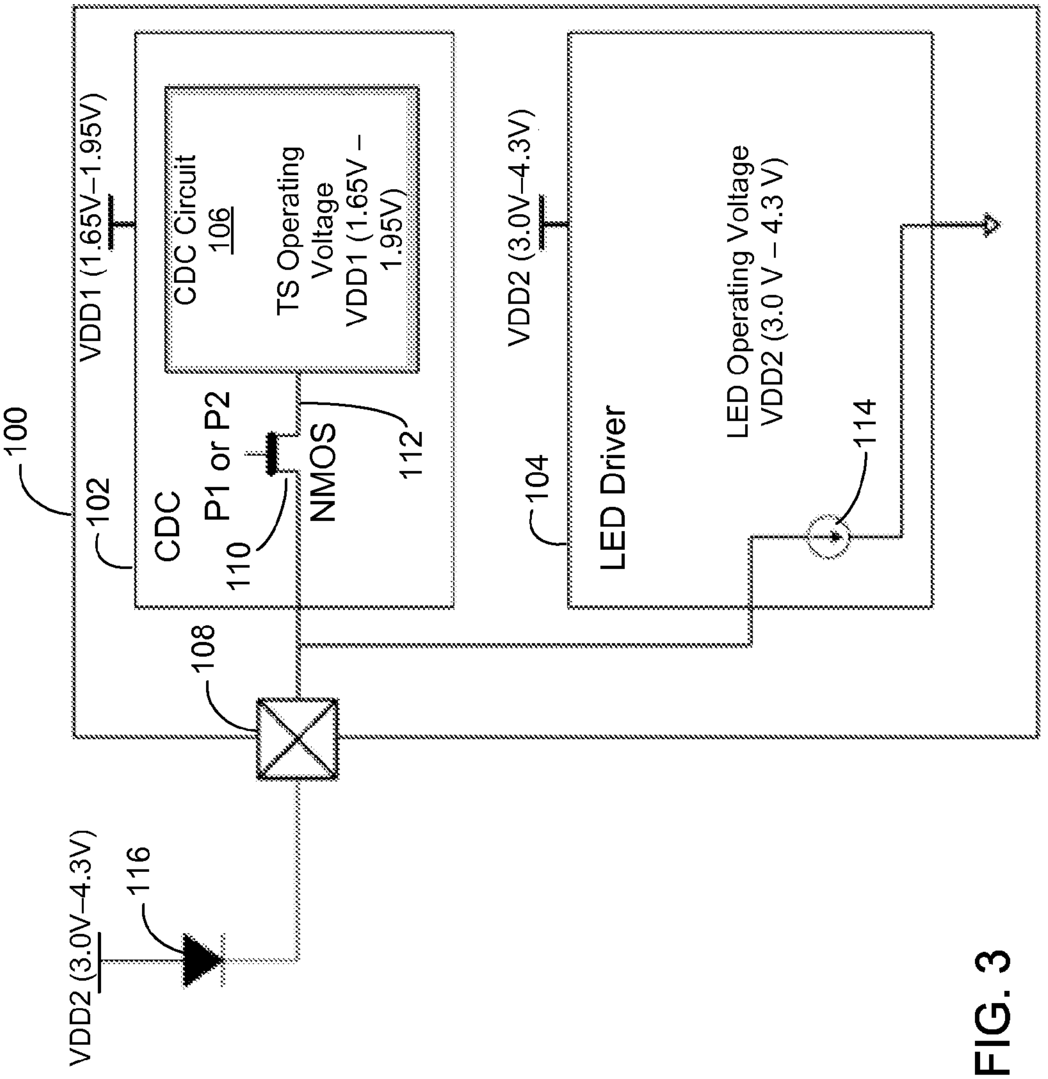
FIG. 3 illustrates a combined capacitance-to-digital converter (CDC) and LED driver used as the LED driver, according to still another embodiment of the present invention.

FIG. 3 illustrates a combined capacitance-to-digital converter (CDC) and LED driver used as the LED driver, according to still another embodiment of the present invention. The IC 100 of FIG. 3 is the same as the IC 100 of FIGS. 1 and 2, except that the IC 100 is used as an LED driver application with the LED driver 104 functioning as a current sink in the example of FIG. 2. Thus, an LED 116 is connected between port 108 and the operating voltage VDD2 of the LED driver 104. The anode of the LED 116 is connected to the operating voltage VDD2 and the cathode of the LED 116 is connected to the port 108. The LED driver 104 includes a current source 114 that functions as a current sink sinking regulated current from the LED 116 through the port 108 of the IC 100. The current source 114 is connected between the port 108 and ground. The NMOS 110 prevents the operating voltage VDD2 from affecting the CDC circuit 106 through the port 108. As explained above, when VDD1 is applied to the gate of NMOS 110, the voltage at node 112 is clamped and does not exceed VDD1−Vt(n), where VDD1 is the operating voltage of the CDC circuit 106 and Vt(n) is the threshold turn-on voltage of NMOS 110. Note that a p-type MOSFET may not be used in the place of NMOS 110, because such p-type MOSFET would pass a voltage higher than VDD1 to the CDC circuit 106.

FIG. 4A illustrates the CDC circuit and how an n-type MOSFET is added to the CDC circuit, according to one embodiment of the present invention. The example of FIG. 4A illustrates the situation when the IC 100 of FIG. 1 is used as a CDC application.

Referring to FIG. 4A, the CDC circuit 106 includes reference capacitor $C_{ref}$, switches 410, 404, 406, 402, amplifiers AMP1, AMP2, capacitor $C_{int}$, an inverter 408, and a D-type flip flop 400. N-type MOSFET 110 is connected in series with the CDC circuit 106 at node B between the two switches 402, 406 and the sense capacitor $C_{sensor}$. Node B is equivalent to node 112 in FIGS. 1, 2, and 3. The sense capacitor $C_{sensor}$ is connected in series with the NMOS 110, between NMOS 110 and ground. Switch 402 is connected between node B and ground. Switch 406 is connected between nodes B and C. Switch 404 is connected between nodes A and C. Switch 410 is connected in parallel with the reference capacitor $C_{ref}$, between voltage VH and node A. Amplifier AMP1 receives the voltage at node C at its negative input terminal and a DC voltage VM that is lower than the DC voltage VH at its positive voltage terminal. Amplifier AMP1 and capacitor $C_{int}$ form an integrator integrating the voltage at node C and outputs an integrated output voltage VOUT. Amplifier AMP2 compares VOUT at its positive input terminal to the voltage at node C at its negative input terminal, and outputs POL. POL is the data input to the D type flip flop 400. The D type flip flop 400 is operated by a clock signal that is an inverted from the oscillator signal OSC by the inverter 408. The non-inverted output of the D type flip flop 400 is the PHASE signal and the inverted output of the D type flip flop 400 is the PHASEB signal.

A non-overlapping 2-phase clock signal (P1 or P2) formed by clock signals P1 and P2 is applied to the gate of NMOS 110 to control the turning on and off of the NMOS 110. As will be explained in more detail below, the clock signals P1 and P2 are non-overlapping in the sense that they are not at logic high at the same time. In other words, if the clock signal P1 is at logic high, the clock signal P2 is at logic low. If the clock signal P2 is at logic high, the clock signal P1 is at logic low. Switches 402, 404 are turned on and off according to the clock signal P1, while switches 406, 410 are turned on and off according to the clock signal P2.

Figure 4B:
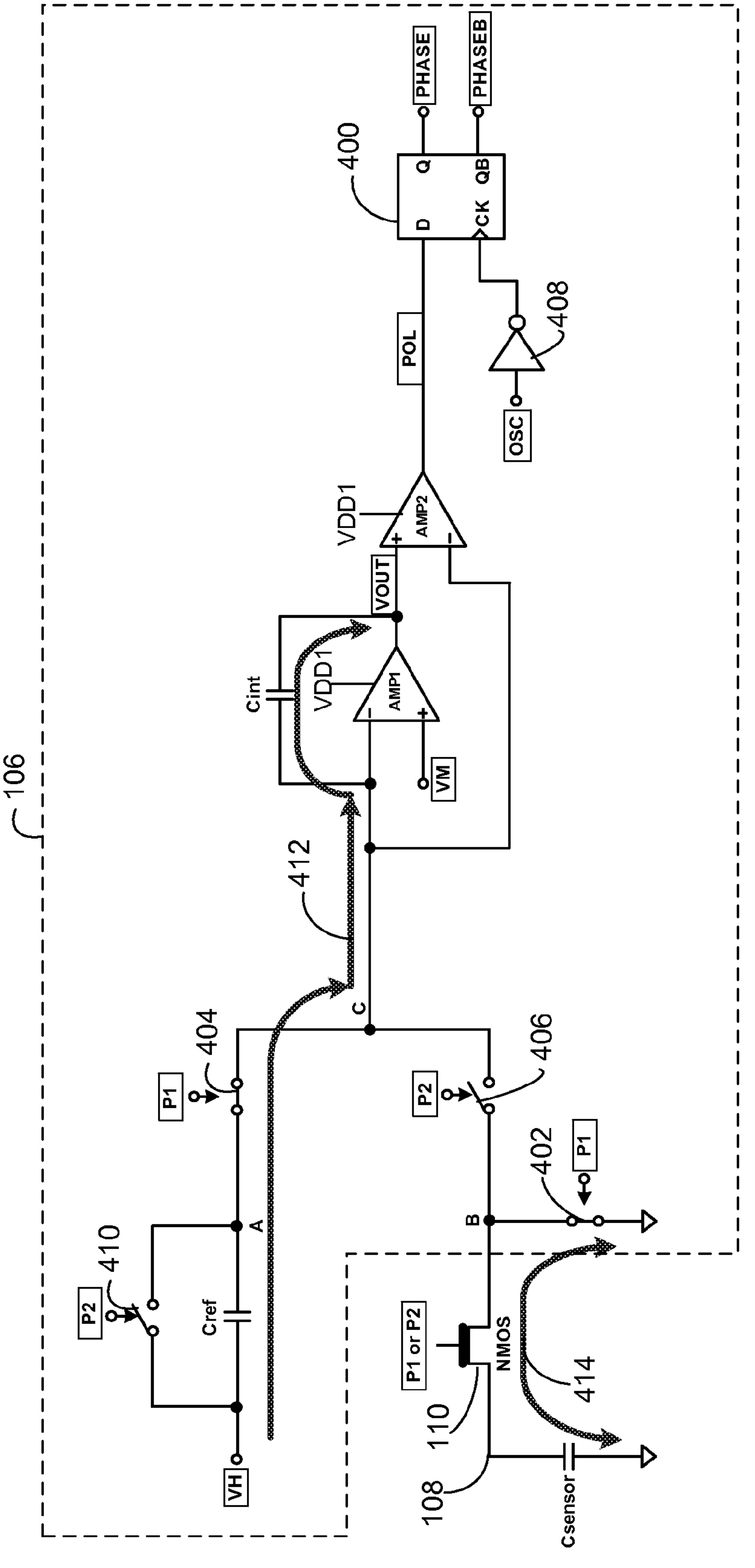
FIG. 4B illustrates the operation of the CDC circuit of FIG. 4A in one phase, according to one embodiment of the present invention.

FIG. 4B illustrates the operation of the CDC circuit of FIG. 4A in one phase, according to one embodiment of the present invention. The example of FIG. 4B illustrates the situation where the clock signal P1 is at logic high and the clock signal P2 is at logic low. Accordingly, switches 402, 404 are turned on and switches 406, 410 are turned off. NMOS 110 is turned on due to clock signal P1. Thus, the charges stored in the sense capacitor $C_{sensor}$ are discharged 414 to ground through the NMOS 110 and the switch 402, thereby resetting the sense capacitor $C_{sensor}$. Since switch 406 is turned off, the sense capacitor $C_{sensor}$ is disconnected from node C. In contrast, the reference capacitor $C_{ref}$ is connected to node C through the switch 404. Positive DC voltage VH charges 412 capacitor $C_{int}$ connected to the negative input of the amplifier AMP1, whose voltage is integrated to generate VOUT. Thus, VOUT is negative and POL is also negative, resulting in the PHASE signal of "0" and PHASEB signal of "1" sampled at the clock frequency of the D-type flip flop 400.

Figure 4C:
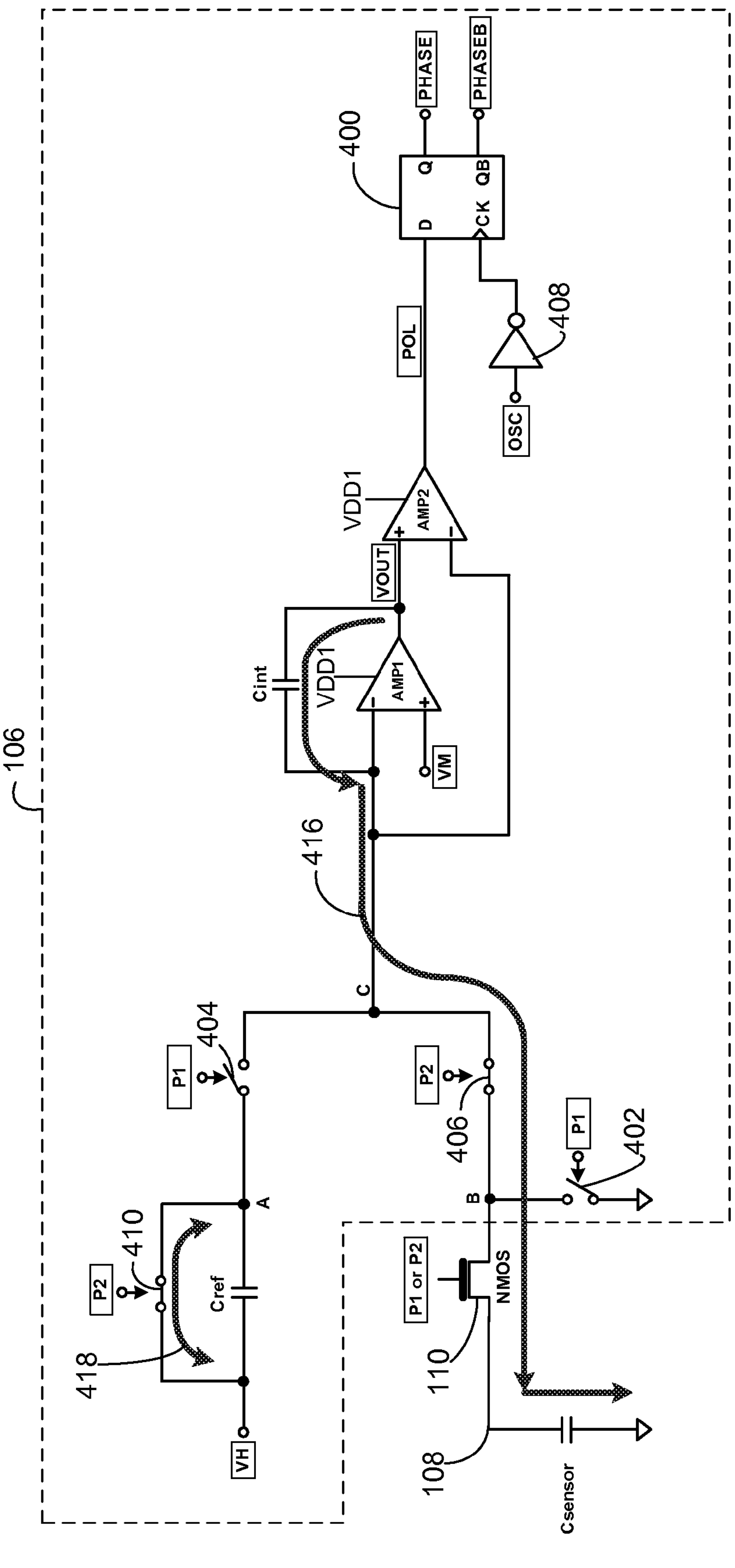
FIG. 4C illustrates the operation of the CDC circuit of FIG. 4A in another phase, according to one embodiment of the present invention.

FIG. 4C illustrates the operation of the CDC circuitry of FIG. 4A in another phase, according to one embodiment of the present invention. The example of FIG. 4C illustrates the situation where the clock signal P1 is at logic low and the clock signal P2 is at logic high. Accordingly, switches 402, 404 are turned off and switches 406, 410 are turned on. NMOS 110 is turned on due to clock signal P2. In this situation, the sense capacitor $C_{sensor}$ is connected to node C through NMOS 110 and the switch 406. Thus, the charges from the integration capacitor $C_{int}$ are stored 416 in the sense capacitor $C_{sensor}$ through the NMOS 110 and the switch 406. Thus, VOUT is positive and POL is also positive, resulting in the PHASE signal of "1" and PHASEB signal of "0" sampled at the clock frequency of the D-type flip flop 400. Since switch 404 is turned off, the reference capacitor $C_{ref}$ is disconnected from node C and is discharged (reset) 418.

Figure 5A:
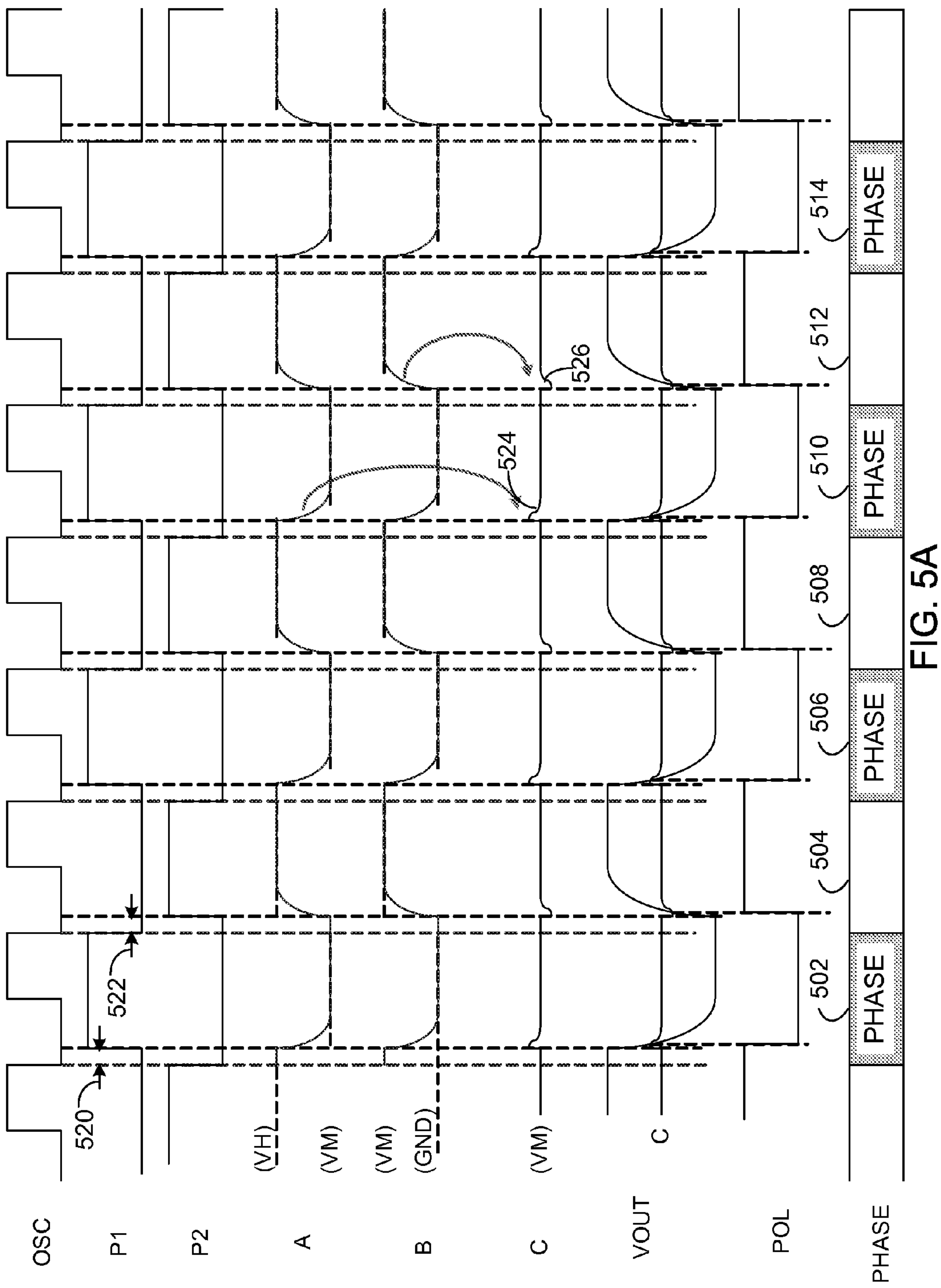
FIG. 5A is a timing diagram illustrating the operation of the CDC circuit of FIG. 4A, when the capacitance on the touch screen is not disturbed by a touch on the touch screen.

FIG. 5A is a timing diagram illustrating the operation of the CDC circuitry of FIG. 4A, when the capacitance on the touch screen is not disturbed by a touch on the touch screen. FIG. 5A is explained in conjunction with FIG. 4A. As shown in FIG. 5A, the oscillator signal OSC provides the inverted clock signal for the D-type flip flop 400. The PHASE signals are sampled 502, 504, . . . , 514 by the D type flip flop 400 at the falling edge of the OSC signal, due to the inverter 408. Signals P1 and P2 together form a non-overlapping 2-phase clock signal, where P1 is at logic high while P2 is at logic low, and P2 is at logic high while P1 is at logic low. Break-before-make intervals 520, 522 are built into the clock signals P1, P2 so that clock signals P1, P2 are not at logic high at the same time.

The voltage at node A transitions from VH to VM when P1 transitions to logic high, and transitions from VM to VH when P2 transitions to logic high. VH is a DC voltage applied to one end of the reference capacitor $C_{ref}$, and VM is another DC voltage lower than VH and applied to the positive input of the amplifier AMP1. The voltage at node B transitions from VM to ground when P1 transitions to logic high, and transitions from ground to VM when P2 transitions to logic high. This is because the voltage at node C is approximately the same as VM with ripples 524 occurring when P1 transitions to logic high and ripples 526 occurring when P2 transitions to logic high. That is, the DC components of the voltage at node C are the same as the voltage VM.

As explained above, the output VOUT of the integrator (AMP1, $C_{int}$) transitions to logic low when P1 transitions to logic high, and transitions to logic high when P2 transitions to logic high. In this manner, VOUT alternates between low voltage and high voltage when the capacitance on the sense capacitor $C_{sensor}$ is not disturbed by a touch on the touch screen. Likewise, the output POL of the amplifier AMP2 transitions to logic low when P1 transitions to logic high, and transitions to logic high when P2 transitions to logic high. In this manner, POL alternates between logic low and logic high when the capacitance on the sense capacitor $C_{sensor}$ is not disturbed by a touch on the touch screen. As a result, PHASE outputs a data stream 502, 504, 506, 508, 510, 512, 514 of "1010101 . . . " when the capacitance on the sense capacitor $C_{sensor}$ is not disturbed by a touch on the touch screen.

Figure 5B:
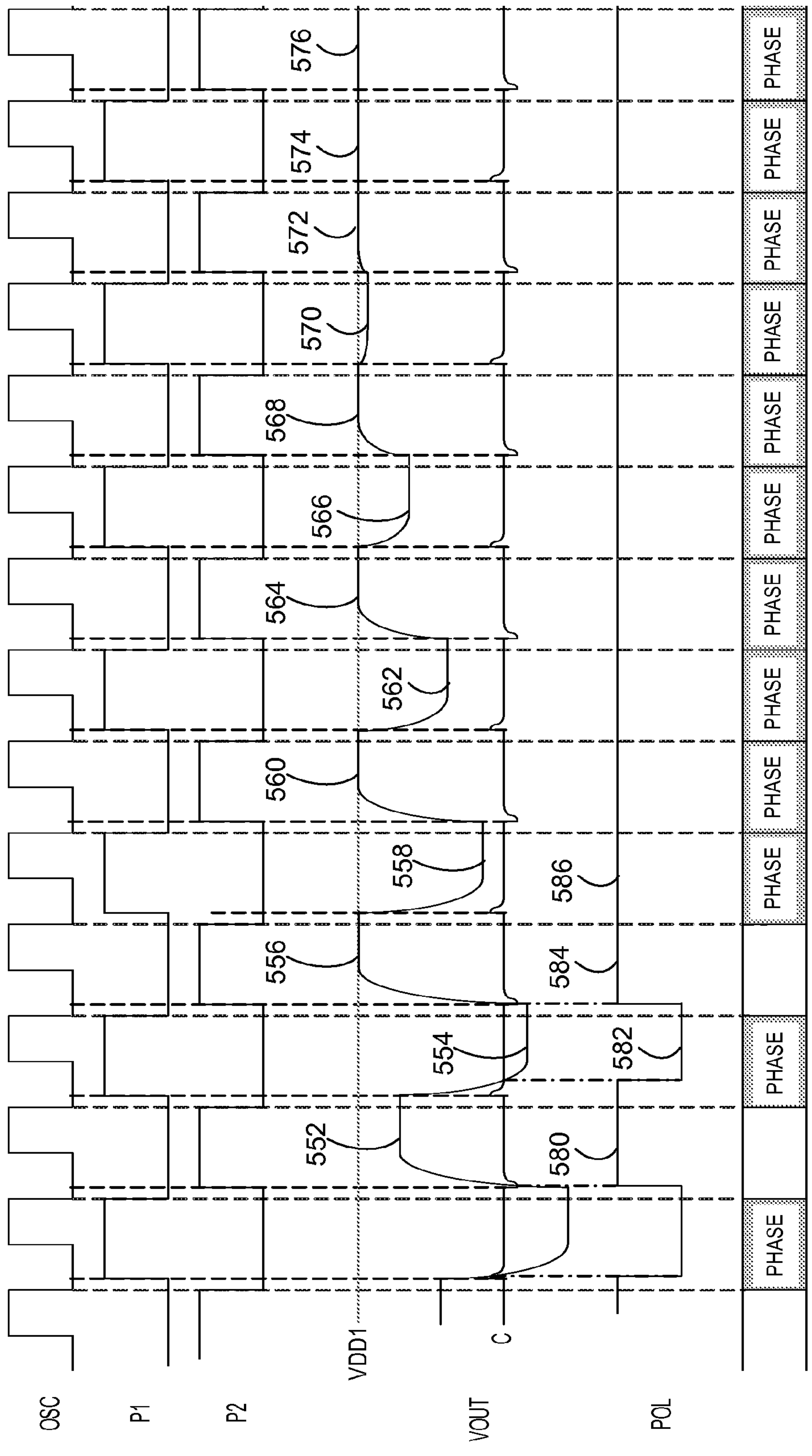
FIG. 5B is a timing diagram illustrating the operation of the CDC circuit of FIG. 4A, when the capacitance on the touch screen is disturbed by a touch on the touch screen.

FIG. 5B is a timing diagram illustrating the operation of the CDC circuitry of FIG. 4A, when the capacitance on the touch screen is disturbed by a touch on the touch screen. The timing diagram of FIG. 5B shows the same signals as those shown in FIG. 5A, except that the voltages at nodes A, B, and C are not shown for simplicity of illustration. When the capacitance on the sense capacitor $C_{sensor}$ is disturbed by a touch on the touch screen, VOUT starts to increase in each cycle 552, 554, 556, 558, 560, 562, 564, 566, 568, 570 and maintains the high voltage 572, 574, 576 saturated at the supply voltage VDD1 of the CDC circuit 106. POL alternates between logic high 580 and logic low 582 as explained previously with reference to FIG. 5B until the point where VOUT does not fall below the voltage at node C (see 558). At that point, the POL also does not return to logic low (i.e., maintains logic high (see 586)). As a result, PHASE outputs a continuous data stream of 1's soon after the capacitance on the sense capacitor $C_{sensor}$ is disturbed by a touch on the touch screen. The PHASE data stream shown in FIG. 5B would be "101011111111111 . . . " Thereafter, when the touch is removed, the PHASE signal will revert to an alternating data stream of "1010101 . . . " as shown in FIG. 5A, although not shown in FIG. 5B.

Upon reading this disclosure, those of skill in the art will appreciate still additional alternative structural and functional designs for a combined touch sensor and LED driver IC. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A combined touch sensor and light-emitting-diode (LED) driver, comprising:

an integrated circuit having a shared port, the integrated circuit comprising:

a capacitance-to-digital converter (CDC) circuit configured to detect a touch, the CDC circuit coupled to the shared port and configured to operate with a first operating voltage, the CDC circuit comprising:

an integrator;

a reference capacitor coupled to a predetermined voltage; and a first switch coupled in series to the reference capacitor to connect or disconnect the reference capacitor to or from the integrator according to a first clock signal;

an LED driver circuit configured to drive an LED if the LED is coupled to the shared port, the LED driver circuit also coupled to the shared port and configured to operate with a second operating voltage that is higher than the first operating voltage; and an n-type field effect transistor connected in series between the shared port and the CDC circuit.

2. The combined touch sensor and LED driver of claim 1, wherein the n-type field effect transistor is an n-type MOSFET (Metal Oxide Semiconductor Field Effect Transistor).

3. The combined touch sensor and LED driver of claim 1, wherein the n-type field effect transistor prevents the second operating voltage from affecting operation of the CDC circuit if the LED is coupled to the shared port.

4. The combined touch sensor and LED driver of claim 1, wherein the n-type field effect transistor is turned on and off in accordance with a non-overlapping, two-phase clock signal.

5. The combined touch sensor and LED driver of claim 1, wherein the CDC circuit is configured to detect charges stored on a sense capacitor coupled to the common node and generate a digital value corresponding to the detected charges.

6. The combined touch sensor and LED driver of claim 5, wherein the CDC circuit further comprises:

a second switch coupled in series to the n-type field effect transistor to connect or disconnect the sense capacitor and the field effect transistor to or from the integrator according to a second clock signal, wherein the first clock signal is at logic high while the second clock signal is at logic low, and the second clock signal is at logic high while the first clock signal is at logic low, wherein the n-type field effect transistor is turned on according to the first clock signal and the second clock signal.

7. The combined touch sensor and LED driver of claim 6, further comprising:

a third switch coupled in parallel to the reference capacitor and turned on or off according to the second clock signal.

8. The combined touch sensor and LED driver of claim 6, further comprising:

a third switch coupled in parallel to the series-connected n-type field effect transistor and the sense capacitor, the third switch turned on or off according to the first clock signal.

9. The combined touch sensor and LED driver of claim 8, wherein the sense capacitor is discharged to ground through the n-type field effect transistor and the third switch when the third switch is turned on according to the first clock signal.

10. The combined touch sensor and LED driver of claim 1, wherein the common node is connected to an anode of the LED, and the LED driver circuit is configured to drive the anode of the LED.

11. A combined capacitance-to-digital converter (CDC) and light-emitting-diode (LED) driver, comprising:

an LED driver circuit configured to drive an LED, if the LED is coupled to a common node of the combined CDC and LED driver, the LED driver circuit coupled to the common node;

a CDC circuit configured to detect charges stored on a sense capacitor coupled to the CDC circuit and generate a digital value corresponding to the detected charges, if the sense capacitor is coupled to the common node of the combined CDC and LED driver, the CDC circuit coupled to the common node; and an n-type MOSFET (Metal Oxide Semiconductor Field Effect Transistor) connected in series between the CDC circuit and the common node, wherein the CDC circuit comprises:

an integrator;

a reference capacitor coupled to a predetermined voltage;

a first switch coupled in series to the reference capacitor to connect or disconnect the reference capacitor to or from the integrator according to a first clock signal; and a second switch coupled in series to the n-type MOSFET to connect or disconnect the sense capacitor and the field effect transistor to or from the integrator according to a second clock signal, the first clock signal being at logic high while the second clock signal is at logic low, and the second clock signal being at logic high while the first clock signal is at logic low, and the n-type MOSFET being turned on according to the first clock signal and the second clock signal.

12. The combined CDC and LED driver of claim 11, wherein the CDC circuit further comprises:

a third switch coupled in parallel to the reference capacitor and turned on or off according to the second clock signal.

13. The combined CDC and LED driver of claim 11, wherein the CDC circuit further comprises:

a third switch coupled in parallel to the series-connected n-type MOSFET and the sense capacitor, the third switch turned on or off according to the first clock signal.

14. The combined CDC and LED driver of claim 13, wherein the sense capacitor is discharged to ground through the n-type MOSFET and the third switch when the third switch is turned on according to the first clock signal.

15. The combined CDC and LED driver of claim 11, wherein the CDC circuit is configured to operate with a first operating voltage and the LED driver circuit is configured to operate with a second operating voltage that is higher than the first operating voltage.

16. The combined CDC and LED driver of claim 15, wherein the n-type MOSFET prevents the second operating voltage from affecting operation of the CDC circuit if the LED is coupled to the combined CDC and LED driver.

17. The combined CDC and LED driver of claim 11, wherein both the CDC circuit and the LED driver circuit are configured to be connected to a shared port of an integrated circuit.

18. The combined CDC and LED driver of claim 11, wherein the common node is connected to an anode of the LED, and the LED driver circuit is configured to drive the anode of the LED.

* * * * *